United States Patent Office 3,488,252
Patented Jan. 6, 1970

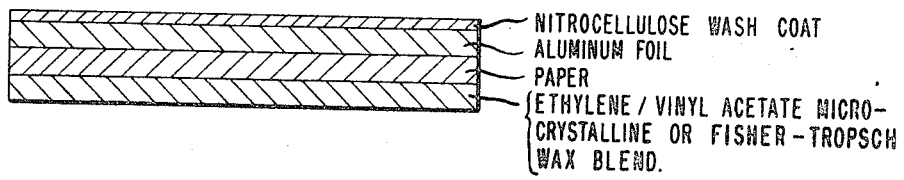
INVENTOR
STANLEY T. LAMAR

3,488,252
COATED ALUMINUM FOIL PAPER LAMINATE
Stanley T. Lamar, Wilmington, Del., assignor to E. I. du Pont de Nemours and Company, Wilmington, Del., a corporation of Delaware
Filed Sept. 2, 1964, Ser. No. 394,030
The portion of the term of the patent subsequent to Nov. 28, 1984, has been disclaimed
Int. Cl. B32b 15/20, 27/30, 15/12
U.S. Cl. 161—213       6 Claims

ABSTRACT OF THE DISCLOSURE

Aluminum foil/paper laminated sheet structures useful as packaging materials for bar soap, cigarette cartons, and the like are provided. The structures comprise an aluminum foil/paper laminate having a nitrocellulose wash coat on the aluminum foil, and an ethylene/vinyl acetate copolymer-wax blend coated onto the paper. The wax in the blend is a microcrystalline or Fischer-Tropsch wax having a melting point of at least 170° F.

BACKGROUND OF INVENTION

This invention relates to printable heat-sealable aluminum foil/paper laminate sheet structures suitable for use in the packaging arts.

Aluminum foil/paper laminated sheet structures are commonly used in packaging, for example, to wrap bar soap, cigarette cartons, and the like. The laminated sheet structures used commercially heretofore have a shellac wash coat on the aluminum, a tacky microcrystalline wax coated onto the paper and having a thin tissue paper adhered onto the microcrystalline wax. In a packaging operation, the object being packaged is wrapped with the sheet structure so as to form an overlap, i.e., an edge to be sealed where the tissue is on contact with the aluminum foil shellac wash coat. Application of heat to the overlapping area causes the microcrystalline wax to pass through the tissue forming a bond.

Although these aluminum foil/paper laminate sheet structures used heretofore have attained considerable commercial success, they have several serious deleterious properties which are undesirable to practitioners in the art. For example, the microcrystalline wax tends to exude to the surface of the laminate structure, and being tacky, often causes packing and processing equipment to jam. Furthermore, there is a tendency for blocking when the sheet structures are stored in rolls. Also, the finished packaged goods, such as wrapped bar soap, etc. often stick together because of this blocking problem. In addition, the microcrystalline wax is very fluid when heated. When heat is applied to the structures in the sealing step, usually an excess amount of the wax penetrates the tissue paper which then rubs off onto the packaging equipment, thereby fouling the equipment. Also, ultimate heat sealed bonds are often undesirably low. Moreover, the heatseal activation times are relatively long and the required activation temperatures are relatively high, resulting in undesirably slow machine times for mass packaging requirements.

Recognizing the known excellent heat-sealability properties of various ethylene/vinyl acetate copolymer-petroleum wax blends, practitioners of the art have attempted to replace the tacky microcrystalline wax and tissue paper of the previously used aluminum foil/paper laminate sheet structures with such copolymer-wax blends. The ethylene/vinyl acetate copolymer-petroleum wax blends overcome the above-stated problems inherent in the structures which employ the combination of tacky microcrystalline wax and tissue paper. However, additional problems arise with these more recently developed sheet structures.

When the aluminum foil/paper laminate sheet structures having ethylene/vinyl acetate copolymer-petroleum wax blends coated onto the paper side of the laminate are stored in rolls under normal commercial storage conditions, there is a transfer of minute quantities of the copolymer-wax blend onto the surface of the aluminum foil. This transfer of minute quantities from the one surface to the other is termed in art as "offset." when offset occurs the minute quantities of the copolymer-wax blends on the aluminum foil surface prevents proper adhesion of common printing inks on the surface, and thus such sheet structures are not printable after they have been stored in rolls, which is the ordinary commercial practice.

Accordingly, it is an object of the present invention to provide improved printable, heat-sealable aluminum foil/paper laminate sheet structures. A further object is to provide improved heat-sealable aluminum foil/paper laminate sheet structures having ethylene/vinyl acetate copolymer-wax blends coated onto the paper side of the laminate, with the sheet structures being printable after storage in rolls.

SUMMARY OF THE INVENTION

These and other objects are attained by the present invention which provides a printable heat-sealable flexible sheet structure comprising an aluminum foil/paper laminate having (1) a nitrocellulose wash coat on the said aluminum foil, (2) a blend containing 15–40% by weight of an ethylene/vinyl acetate copolymer having a copolymerized vinyl acetate content of 15–35% by weight and a melt index of 0.1–500 and a wax having a melting point of at least 170° F. selected from the group consisting of microcrystalline waxes and Fischer-Tropsch waxes coated onto the said paper.

DESCRIPTION OF DRAWING

The drawing represents a cross-section view of the sheet structures of this invention.

DESCRIPTION OF INVENTION

The aluminum foil/paper laminates used in this invention may be obtained from commercial sources, or may be prepared by adhering aluminum foil and paper together with a flexible adhesive. Suitable flexible adhesives include casein latex, low molecular weight polyethylene, microcrystalline wax, ethylene/vinyl acetate copolymer-petroleum wax blends, and the like.

It has been standard practice in the art to coat the aluminum surface of the laminates used heretofore with shellac. However when the aluminum surface of the sheet structures of this invention are coated with shellac, there is considerable offset when the sheet structures are stored in rolls, resulting in totally unacceptable printability properties. It has been discovered that coating the aluminum surface with nitrocellulose instead of shellac eliminates the offset problem and the resulting sheet structures are printable after storage under normal commercial conditions. The nitrocellulose coating (commonly termed a "wash coat") may be applied from a solution of nitrocellulose in a suitable solvent such as butyl acetate. After the nitrocellulose solution is applied by doctoring, brushing, spraying, or other suitable means, the solvent is evaporated leaving the necessary nitrocellulose wash coat on the aluminum surface of the laminate.

The paper side of the aluminum foil/paper laminate must be coated with an ethylene/vinyl acetate copolymer-microcrystalline or Fischer-Tropsch wax blend having specific critical component and proportion limitations.

The ethylene/vinyl acetate copolymers used in this invention must have a copolymerized vinyl acetate content of from 15 to 35% by weight of the copolymer. Copolymer-wax blends prepared from ethylene/vinyl acetate copolymers having a copolymerized vinyl acetate content of greater than about 35% by weight are too soft and tacky, resulting in intolerable blocking. The use of copolymers having a copolymerized vinyl acetate content of less than about 15% results in copolymer-wax blends having undesirably poor sealability, high brittleness, and low crease resistance. Best results are obtained with ethylene/ vinyl acetate copolymers having a copolymerized vinyl acetate content of 20 to 30% by weight. It is also critical to this invention that the ethylene/vinyl acetae copolymers have a melt index of 0.1 to 500 grams/10 minutes as determined by the procedure of ASTM method D–1238–57T. Copolymers having a melt index of greater than about 500 are too soft to be of use in this invention. The preferred ethylene/vinyl acetate copolymers of this invention have a melt index of 1 to 20.

The ethylene/vinyl acetate copolymers may be prepared by any convenient process, such as disclosed in U.S. Patent 2,200,429, issued to Perrin et al., and U.S. Patent 2,703,794, issued to Roedel.

Both paraffin, microcrystalline, and synthetic waxes have been blended with ethylene/vinyl acetate copolymers for various purposes. Paraffin wax is a mixture of solid hydrocarbons derived from the overhead wax distillate fraction obtained from the fractional distillation of petroleum. After purification, the paraffin wax contains hydrocarbons that fall within the formula $C_{23}H_{48}$—$C_{35}H_{72}$. It is a substantially colorless, hard, and translucent material usually having a melting point of from 125 to 165° F. Microcrystalline wax is obtained from the nondistillable still residues from the fractional distillation of petroleum. It differs from paraffin wax in having branched hydrocarbons of higher molecular weight. It is considerably more plastic than paraffin wax and usually has a melting point of about 150–200° F. Fischer-Tropsch waxes are synthetic hydrocarbon waxes of very high molecular weight obtained as by-products in the synthesis of liquid fuels (gasoline and diesel oil) from carbon monoxide and hydrogen by the Fischer-Tropsch process. These synthetic waxes generally have melting points within the range of 100 to 250° F.

For use in this invention it is essential to select a microcrystalline wax or Fischer-Tropsch wax having a melting point of at least 170° F. Copolymer-wax blends containing microcrystalline or Fischer-Tropsch waxes having lower melting points are inoperable in this invention because of excessive tackiness and because such blends cause offset when aluminum foil/paper laminate sheets coated therewith are stored in rolls under normal commercial storage conditions. Consequently, sheet structures coated with blends containing such waxes do not have acceptable printability properties. The ordinary paraffin waxes are also inoperable in this invention for the same reasons, although it should be noted that excellent aluminum foil/paper laminate sheets can be prepared by coating the paper side of the sheets with a blend of the copolymer and a paraffin wax having a melting point of at least 150° F. and then coating the blend with powdered corn starch or an acrylic lacquer. In the present invention, to decrease the melt viscosities of the blends and/or for economic considerations, part of the microcrystalline or Fischer-Tropsch wax may be substituted with a paraffin wax, in which case it is preferred to have at least 50% by weight of the wax being the microcrystalline or Fischer-Tropsch wax described above, and to use a paraffin wax having a melting point of at least 150° F.

The ethylene/vinyl acetate copolymer wax blends of this invention must contain 15 to 40% by weight of the copolymer and 60–85% by weight of wax. The minimum operable copolymer concentration is a function of the copolymerized vinyl acetate content and melt index of the copolymer, and also depends on whether the laminate sheet structures are to be heat sealed with the blend surface adhered to the aluminum foil surface or with the blend-to-blend. Where the sheet structures are sealed so that the blend surface is adhered to another blend surface, as in a cereal box liner or the like, all of the ethylene/ vinyl acetate copolymers of this invention, described above, may be used at a concentration of 15%. However, if the sheet structures are to be overlapped and sealed with the blend surface adhered to the aluminum foil surface, as in carton packaging or the like, in some instances it may be necessary to incorporate more than 15% of the copolymer into the blend in order to obtain desirable heat seal bond strengths. Heat seal bond strengths vary directly with the copolymerized vinyl acetate content of the copolymers and vary inversely with the melt index of the copolymers. Therefore, large amounts of copolymers having relatively low copolymerized vinyl acetate contents or relatively high melt indexes may be required. The operable lower concentration limit of the copolymer in the blend may be easily determined by routine experimentation. Optimum properties are obtained with blends containing 20–30% by weight ethylene/vinyl acetate copolymer and 70–80% wax. The copolymer-wax blends may be prepared by any of the convenient means familiar to those skilled in art such as by heating and agitating the components to obtain a homogeneous melt.

The aluminum foil/paper laminate sheet structures of this invention are non-blocking, do not exude any materials which tend to jam processing and packaging equipment, do not offset and therefore can be conventionally printed after storage in rolls under normal commercial storage conditions, and provide excellent ultimate heat seal bonds and relatively short heat seal activation times and low activation temperatures thus being suitable for use in rapid mass packaging processes. Therefore, it will be recognized that the present invention represents a marked improvement over the aluminum foil/paper laminate sheet structures used heretofore.

This invention is further illustrated by the following examples.

Example 1

This example illustrates the printability properties of the aluminum foil/paper laminate sheet structures of this invention compared to the printability properties of aluminum foil/paper laminate sheet structures used heretofore. In this example, aluminum foil/paper laminate sheets having copolymer-wax blends, as noted in Table I, coated onto the paper of the laminate are placed in contact with wash coated aluminum foil surfaces, under 25 p.s.i. pressure at 73° F., thus simulating commercial roll-storage conditions. Other commercial aluminum foil/ paper laminate sheets having the conventional tacky microcrystalline wax-tissue paper layers adhered to the paper side of the laminates are also placed in contact with wash coated aluminum foil surfaces under the same conditions. The sheets are maintained in such contact for 32 days. Thereafter, the wash coated aluminum surfaces are completely printed with a commercial green printing ink and allowed to air dry for several minutes. Cellophane tape (No. 610 High-Tack "Scotch Tape") is then placed on the printed surfaces and pulled off with short jerky motions at a 180° angle with the surfaces. The tapes are then placed on white bond paper so that any pickoff of the green ink onto the tape could be readily seen. In this test, ink is removed from the printed surfaces at any point where there is offset. Therefore, the amount of ink picked off by the tape is a direct indication of the amount of offset, which in turn is a direct measure of the printability properties of the aluminum foil/paper laminate sheets after storage in rolls under normal commercial conditions. In Tests 1–5 of this example, the aluminum surfaces have a nitrocellulose wash coat. In Tests 6–10, the aluminum surfaces have a conventional shellac wash coat. In Tests 1 and 6, the paper sides of the sheets are coated with a blend of 25% by weight of an ethylene/vinyl acetate copolymer having a copolymerized vinyl acetate content of 24% by weight and a melt index of about 15, and 75% of a microcrystalline wax having a melting point of 193° F. In Tests 2 and 7, the paper sides of the sheets are coated with a blend of 25% of the copolymer used in Tests 1 and 6 and 75% of a Fischer-Tropsch wax having a melting point of 215° F. In Tests 3 and 8, the paper sides of the sheets are coated with a blend of 25% of the copolymer used in Tests 1 and 6, 10.5% of a paraffin wax having a melting point of 153° F., and 64.5% of a microcrystalline wax having a melting point of 193° F. In Tests 4 and 9, the paper sides of the sheets are coated with a blend of 25% of an ethylene/vinyl acetate copolymer having a copolymerized vinyl acetate content of 28% by weight and a melt index of 15, and 75% of a paraffin wax having a melting point of 153° F. In Tests 5 and 10, commercial aluminum foil/paper laminates are used having tacky microcrystalline wax and tissue paper layers on the paper sides of the laminates. The results of this test are summarized in Table I, wherein the following abbreviations are used:

E/VA—ethylene/vinyl acetate copolymer
Micro—Microcrystalline wax
F-T—Fischer-Tropsch wax
Par.—Paraffin wax
Micro-tissue—tacky microcrystalline wax-tissue paper layer The relative degree of offset is indicated as none, trace, light, medium, and heavy. While laminates having an offset of "light" have been used commercially heretofore, "none" or "trace" offset is desired.

TABLE I

| Test No. | Wash coat on aluminum foil | Coating on paper | Degree of offset after 32 days |
|---|---|---|---|
| 1 | Nitrocellulose | E/VA-Micro | None. |
| 2 | do | E/VA-F.T | Do. |
| 3 | do | E/VA-Par.-Micro | Trace. |
| 4 | do | E/VA-Par | Medium. |
| 5 | do | Micro-tissue | Trace. |
| 6 | Shellac | E/VA-micro | Medium. |
| 7 | do | E/VA-F.T | Do. |
| 8 | do | E/VA-Par.-micro | Heavy. |
| 9 | do | E/VA-Par | Do. |
| 10 | do | Micro-tissue | Light. |

This invention has been described in considerable detail. However, those skilled in the art will recognize many variations and modifications of these details which can be made without departing from the spirit and scope of this invention. Accordingly, it should be understood that this invention is not intended to be limited except as defined by the following claims.

I claim:

1. A printable heat-sealable flexible sheet structure comprising an aluminum foil/paper laminate having (1) a nitrocellulose wash coat on the exposed side of said aluminum foil, and (2) a blend containing 15-40% by weight of an ethylene/vinyl acetate copolymer having a copolymerized vinyl acetate content of 15-35% by weight and a melt index of 0.1-500 and 60-85% by weight of a wax at least 50% by weight of which has a melting point of at least 170° F. and is selected from the group consisting of microcrystalline waxes and Fischer-Tropsch waxes coated onto the exposed side of said paper.

2. A printable heat-sealable flexible sheet structure comprising an aluminum foil/paper laminate having (1) a nitrocellulose wash coat on the exposed side of said aluminum foil, and (2) a blend containing 15-40% by weight of an ethylene/vinyl acetate copolymer having a copolymerized vinyl acetate content of 15-35% by weight and a melt index of 0.1 to 500, and 60-85% by weight of a microcrystalline wax having a melting point of at least 170° F. coated onto the exposed side of said paper.

3. A printable heat-sealable flexible sheet structure comprising an aluminum foil/paper laminate having (1) a nitrocellulose wash coat on the exposed side of said aluminum foil, and (2) a blend containing 15-40% by weight of an ethylene/vinyl acetate copolymer having a copolymerized vinyl acetate content of 15-35% by weight and a melt index of 0.1 to 500, and 60-85% by weight of a Fischer-Tropsch wax having a melting point of at least 170° F. coated onto the exposed side of said paper.

4. A printable heat-sealable flexible sheet structure comprising an aluminum foil/paper laminate having (1) a nitrocellulose wash coat on the exposed side of said aluminum foil, and (2) a blend containing 20-30% by weight of an ethylene/vinyl acetate copolymer having a copolymerized vinyl acetate content of 20-30% by weight and a melt index of 1-20, and 70-80% by weight of a wax at least 50% by weight of which has a melting point of at least 170° F. and is selected from the group consisting of microcrystalline waxes and Fischer-Tropsch waxes coated onto the exposed side of said paper.

5. A printable heat-sealable flexible sheet structure comprising an aluminum foil/paper laminate having (1) a nitrocellulose wash coat on the exposed side of said aluminum foil, and (2) a blend containing 20-30% by weight of an ethylene/vinyl acetate copolymer having a copolymerized vinyl acetate content of 20-30% by weight and a melt index of 1-20, and 70-80% by weight of a microcrystalline wax having a melting point of at least 170° F. coated onto the exposed side of said paper.

6. A printable heat-sealable flexible sheet structure comprising an aluminum foil/paper laminate having (1) a nitrocellulose wash coat on the exposed side of said aluminum foil, and (2) a blend containing 20-30% by weight of an ethylene/vinyl acetate copolymer having a copolymerized vinyl acetate content of 20-30% by weight and a melt index of 1-20, and 20-80% by weight of a Fischer-Tropsch wax having a melting point of at least 170° F. coated onto the exposed side of said paper.

References Cited

UNITED STATES PATENTS

| 2,778,760 | 1/1957 | Hurst | 161—165 |
| 2,976,170 | 3/1961 | Eiland | 161—220 |
| 3,175,986 | 3/1965 | Apikos et al. | |
| 3,189,573 | 6/1965 | Oken. | |
| 3,215,657 | 11/1965 | Berasniewicz et al. | |

OTHER REFERENCES

Warth: "The Chemistry and Technology of Waxes" 1956, pages 468, 469, 791 and 792 cited.

ROBERT F. BURNETT, Primary Examiner

R. J. ROCHE, Assistant Examiner

U.S. Cl. X.R.

61—220, 251; 117—76, 121, 155, 161